US009285387B2

(12) United States Patent
Foster et al.

(10) Patent No.: US 9,285,387 B2
(45) Date of Patent: Mar. 15, 2016

(54) IN-FLIGHT PITOT-STATIC CALIBRATION

(75) Inventors: John V. Foster, Williamsburg, VA (US); Kevin Cunningham, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 527 days.

(21) Appl. No.: 12/967,690

(22) Filed: Dec. 14, 2010

(65) Prior Publication Data

US 2011/0238373 A1 Sep. 29, 2011

Related U.S. Application Data

(60) Provisional application No. 61/286,089, filed on Dec. 14, 2009.

(51) Int. Cl.
| | | |
|---|---|---|
| G06F 11/30 | (2006.01) | |
| G01P 5/16 | (2006.01) | |
| G01P 13/02 | (2006.01) | |
| G01P 21/02 | (2006.01) | |
| G01F 1/50 | (2006.01) | |
| G01F 1/46 | (2006.01) | |

(52) U.S. Cl.
CPC ............... *G01P 5/16* (2013.01); *G01P 13/025* (2013.01); *G01P 21/025* (2013.01); *G01F 1/46* (2013.01); *G01F 1/50* (2013.01)

(58) Field of Classification Search
USPC .................. 702/47, 50, 96, 98, 182, 183, 185
See application file for complete search history.

(56) References Cited

U.S. PATENT DOCUMENTS

| | | | | | |
|---|---|---|---|---|---|
| 3,029,636 | A | * | 4/1962 | Mullins, Jr. ................ | 73/178 R |
| 3,154,944 | A | * | 11/1964 | Johanson ..................... | 73/182 |
| 3,585,859 | A | * | 6/1971 | De Leo et al. .............. | 73/700 |
| 3,646,811 | A | * | 3/1972 | DeLeo et al. ............... | 73/182 |
| 4,825,374 | A | * | 4/1989 | King et al. .................. | 701/5 |
| 5,616,861 | A | * | 4/1997 | Hagen ......................... | 73/180 |
| 5,669,582 | A | * | 9/1997 | Bryant et al. ............. | 244/76 C |
| 5,946,642 | A | * | 8/1999 | Hedrick ..................... | 702/138 |
| 6,761,057 | B2 | * | 7/2004 | Cronin et al. ............. | 73/1.78 |
| 2004/0193333 | A1 | * | 9/2004 | Tschepen et al. .......... | 701/7 |
| 2007/0150122 | A1 | * | 6/2007 | Hongerholt et al. ....... | 701/3 |

OTHER PUBLICATIONS

Gallagher, G., Higgins, L., Khinoo, L., Pierce, P. Fixed Wing Performance. USNTPS-FTM-No. 108, Chapter 2 [online], Sep. 1992 [retrieved on May 3, 2013]. Retrieved from the Internet: <http://www.usntpsalumni.org/html/usntps-ftm-no_108.htm>.*

Jordan, Thomas L., Foster, John V., Bailey, Roger M., and Belcastro, Christine, M.; AirSTAR: A UAV Platform for Flight Dynamics and Control System Testing, AIAA-2006-3307.

Cunningham, Kevin, Foster, John V., Morelli, Eugene A., and Murch, Austin M.; Practical Application of a Subscale Transport Aircraft for Flight Research in Control Upset and Failure Conditions, AIAA-2008-6200, Aug. 2008.

(Continued)

*Primary Examiner* — Paul D Lee
(74) *Attorney, Agent, or Firm* — Robin W. Edwards

(57) ABSTRACT

A GPS-based pitot-static calibration system uses global output-error optimization. High data rate measurements of static and total pressure, ambient air conditions, and GPS-based ground speed measurements are used to compute pitot-static pressure errors over a range of airspeed. System identification methods rapidly compute optimal pressure error models with defined confidence intervals.

9 Claims, 8 Drawing Sheets

(56) References Cited

OTHER PUBLICATIONS

Niehwoehner, Robert J., Refining Satellite Methods for Pitot-Static Calibration, Journal of Aircraft, vol. 43, No. 3, May-Jun. 2006.

Kimberlin, Ralph and Sims, Joseph, Airspeed Calibration Using GPS, 6th AIAA Biennial Flight Test Conference, Hilton Head Island, SC, AIAA 92-4090, Aug. 1992.

Knoedler, Andrew J., et al; Investigation of Global Positioning System Use for Air Data System Calibration, U.S. Air Force Test Pilot School, 1996.

Knoedler Andrej J., et al; Investigation of Global Positioning AIAA-1996-3417-841, Atmospheric Flight Mechanics Conference, 1996.

Calibration of General Aviation Aircraft (Have Pacer II), AFFTC-TR-95-76, Air Force Flight Test Center, Edwards AFB, CA, Jan. 1996.

Morelli, Eugene A., System IDentification Programs for AirCraft (SIDPAC), AIAA-2002-4704, Atmospheric Flight Mechanics Conference, Aug. 5-8, 2002, Monterey, CA.

Lewis, Gregory; Using GPS to Determine Pitot-Static Errors, National Test Pilot School, Aug. 14, 2003.

* cited by examiner

IN-FLIGHT PITOT-STATIC CALIBRATION

CROSS REFERENCE TO RELATED APPLICATIONS

This application claims the benefit of priority under 35 U.S.C. §119 of U.S. Provisional Patent Application No. 61/286,089, filed Dec. 14, 2010, the contents of which are incorporated by reference in their entirety.

STATEMENT REGARDING FEDERALLY SPONSORED RESEARCH OR DEVELOPMENT

The invention described herein may be manufactured and used by or for the Government of the United States of America for governmental purposes without the payment of any royalties thereon or therefor.

BACKGROUND OF THE INVENTION

1. Field of the Invention

This invention relates to in-flight calibration of aircraft pitot-static systems. More specifically, the invention models pressure error as a continuous function of airspeed rather than computing error for discrete airspeeds. High data-rate measurements of static and differential pressure and Global Positioning System (GPS)-based ground speed measurements are utilized for computing pressure errors over a range of airspeed.

2. Description of the Related Art

Pressure-based airspeed and altitude systems are susceptible to errors in measurements of static and differential pressures. Static pressure errors are typically introduced by the disturbances in the flow field around the aircraft, which necessitates careful positioning of static pressure ports to minimize this effect. Errors in differential pressure sensing from a pilot tube can be caused by excessive flow angularity or flow field interferences with the aircraft. Because of these potential errors, pressure-based airspeed and altitude measurements for aircraft typically require calibration of the installed pitot-static system. Several methods and devices have been used for in-flight pitot-static calibration. These include tower fly-by, pacer aircraft, and trailing cone methods.

The approach to in-flight calibration methods generally involves comparison of onboard airspeed and altitude measurements with "truth data" such as ground referenced speed and altitude or measurements from a calibrated aircraft. A common practice for pitot-static system calibration is to assume all pressure errors are due to static pressure measurements that in turn are used to derive airspeed corrections.

The introduction of satellite-based positioning systems enabled new in-flight calibration methods based on accurate ground speed measurements. Generally, these techniques involve flying a defined flight track, such as a triangle or square, at constant airspeed and heading and solving for the wind speed, wind direction and true airspeed. Calibrated impact pressure ($q_c$) is then compared to the measured impact (or differential) pressure ($q_{ci}$) to compute the error in terms of static pressure and/or calibrated airspeed. Pressure errors are often presented in the form of normalized pressure error ($\Delta p/q_c$) versus measured differential pressure ($q_{ci}$). This approach requires completion of multiple flight patterns for each airspeed and configuration, which can require lengthy flight time and associated costs. These systems are not practical for in-flight calibration of pitot-static systems for remotely piloted, dynamically-scaled aircraft due to confined test range size and limited flight time available for calibration flights.

SUMMARY OF THE INVENTION

Accordingly, it is an object of the present invention to provide a system and method for in-flight calibration of pitot-static systems using a confined test range and limited flight time.

Another object of the present invention is to provide a system and method for rapidly estimating the differential pressure sensing errors using GPS-derived ground speed data.

Another object is to provide rapid estimation of differential pressure sensing errors using rapid algorithms with statistical basis.

A further object is to identify an optimal model of pressure error as a function of differential pressure throughout the speed range of interest, rather than measurements and calibration at multiple fixed airspeeds.

Yet another object is to identify an optimal model of pressure error as a function of differential pressure using global output-error optimization algorithms.

Still another object is to perform the entire calibration over a range of airspeed all at the same time, using an output-error system identification algorithm.

Other objects and advantages of the present invention will become more obvious hereinafter in the specification and drawings.

In accordance with the present invention, high data rate measurements of static and differential pressure, and GPS-based ground speed measurements are used to compute pitot-static pressure errors over a range of airspeed. System identification methods rapidly compute optimal pressure error models with defined confidence intervals.

DETAILED DESCRIPTION OF THE INVENTION

Figure 1:
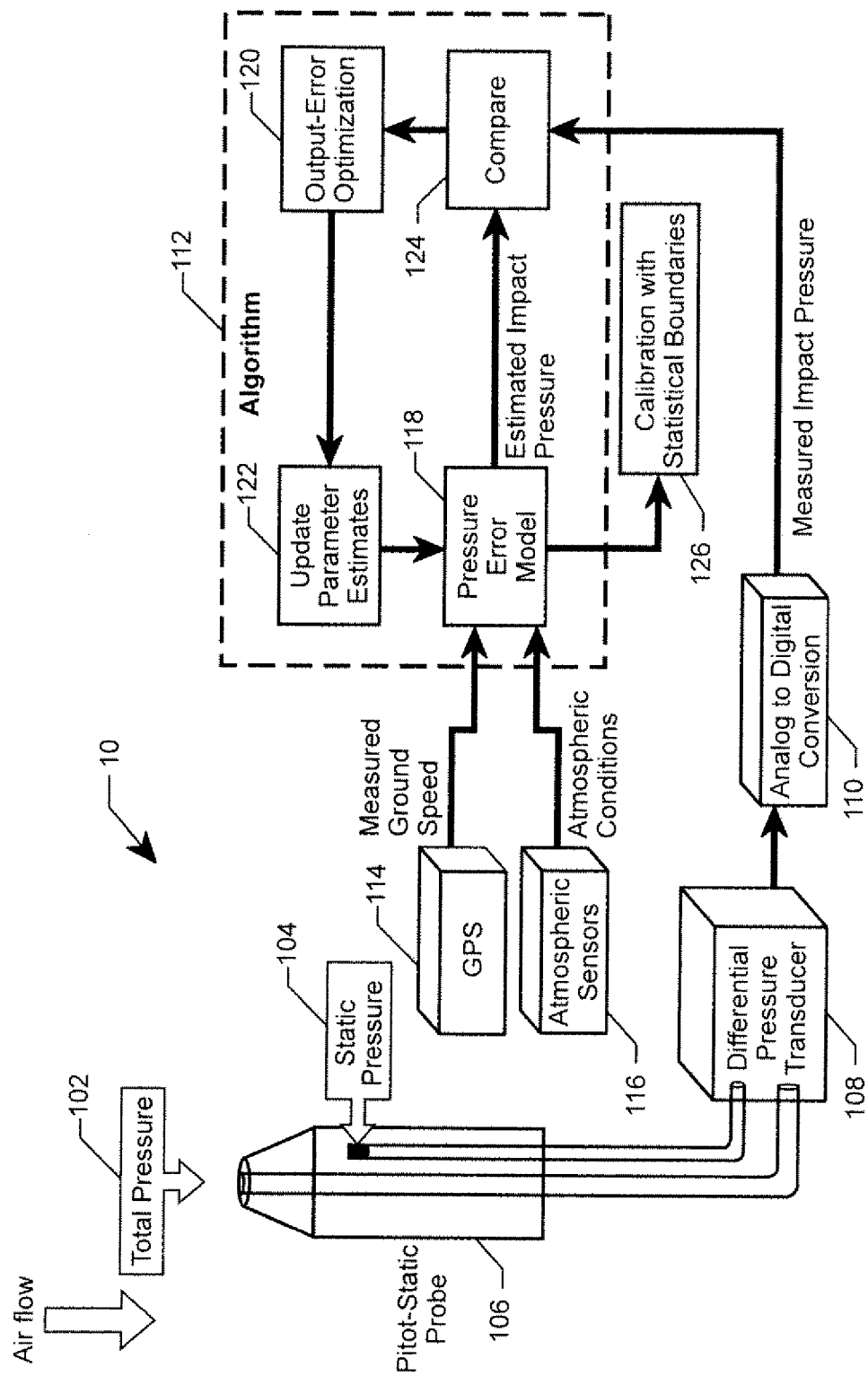
FIG. 1 is a schematic view of the calibration process.

Referring now to the drawings, wherein like reference numerals refer to like components, and more particularly to FIG. 1, a calibration system 10 in accordance with an embodiment of the present invention is shown. High rate measurements of impact pressure 102 and static pressure 104 are acquired and recorded continuously for a continuous flight pattern within set range boundaries throughout the speed range of interest. The test aircraft is outfitted with pitot-static probes 106 that are plumbed to onboard differential pressure transducers 108 to acquire static and differential pressure measurements. A suitable sample rate, such as 50 Hz, is used. The sample rate is determined by the data system, generally ranging from about 10 Hz to about 200 Hz. It is to be noted that 50 Hz is not a limitation of the present invention, as other suitable rates can be used. The transducer output is converted 110 from analog to digital signal for calibration processing 112.

Figure 2:
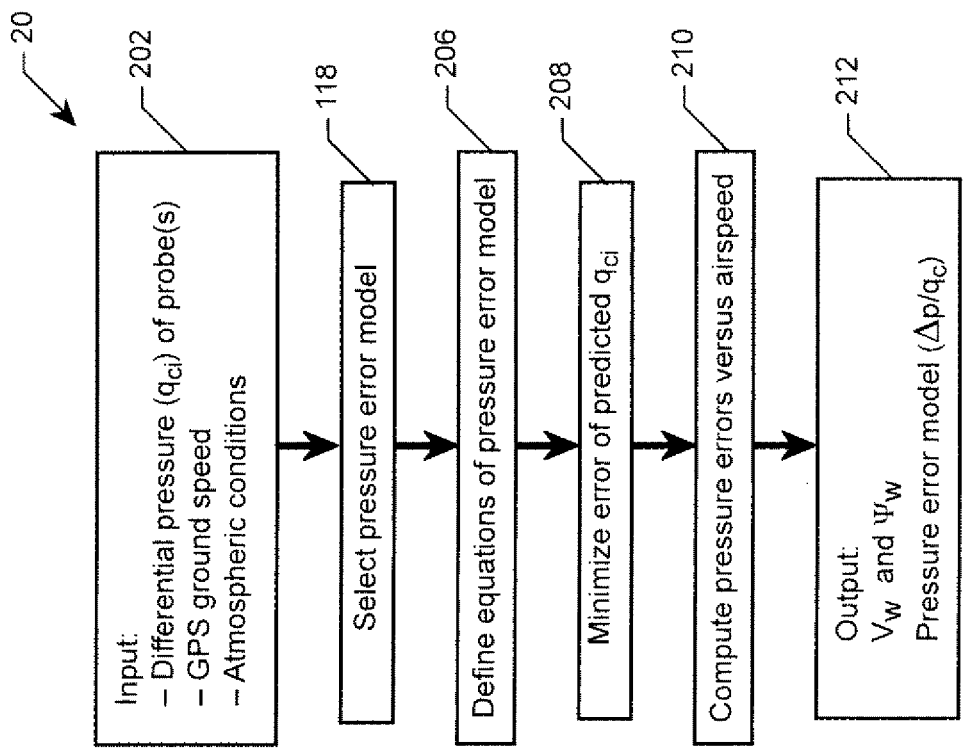
FIG. 2 is a flowchart providing further details of the pressure error modeling and output-error.
Figure 3:
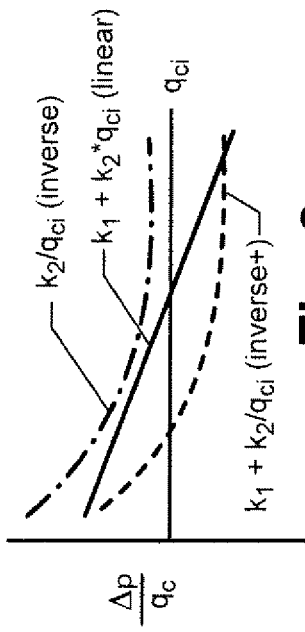
FIG. 3 illustrates various pressure error models.

The calibration process 112, as illustrated in FIG. 2 and further illustrated via the block diagram 20 of FIG. 2, involves integration of direct measurements of ground speed received from a global positioning system 114, atmospheric conditions 116 (such as air temperature and density), and differential pressure from the pitot-static probe 106. The algorithm 112 computes the pressure error model 118 as a function of indicated airspeed and optimizes 120 the model parameters based on comparisons 124 of the measured impact pressure with the estimated impact pressure. Using Output-Error Optimization 120, the model parameters are automatically adjusted 122 to minimize the error between the measured impact pressure and the estimated impact, pressure from the model 118. Pressure error model 118 output is computed 126 with statistical boundaries.

Referring to FIG. 2, block diagram 20 further illustrates the algorithm used for the calibration. Input, comprising the differential pressure ($q_{ci}$) of the pitot-static probe 106, GPS 114 produced ground speed, and atmospheric conditions is received by the selected pressure error model 118 and its defined equations 206. The error of predicted $q_{ci}$ is then minimized 208. System identification methods, using output-error optimization 120, are used to generate the continuous pressure error function over the range of airspeed tested. An optimization algorithm from the System Identification Programs for AirCraft (SIDPAC) software can be used, such as the output error routine (OE) described in Klein, Vladislav and Morelli, Eugene A; Aircraft System Identification, Theory and Practice, AIAA Education Series, 2006, incorporated herein by reference in its entirety. The present invention is not limited to this output error routine, as other suitable routines may also be used. Pressure error versus airspeed is computed 210 and calibrated with statistical boundaries. $\Delta p/q_c$, wind speed $V_w$ and wind direction $\psi_w$ are output 212.

The pressure error can be determined by the equation:

$$\Delta p = q_c - q_{ci}$$

where $q_c$ and $q_{ci}$ are true calibrated impact pressure and measured impact pressure, respectively. The impact pressure $q_c$ can be determined by:

$$q_c = f(\rho, p_a, V_t)$$

where $\rho$ is air density, $p_a$ is ambient air pressure (assumed to be measured static pressure for this calculation), and $V_t$ is true airspeed. True airspeed for level flight $V_t$ can be determined by:

$$V_t = (V_{tn}^2 + V_{te}^2)^{1/2}$$

where $V_{tn}$ is the north component of true airspeed and $V_{te}$ is the east component of true airspeed. The north component of the true airspeed $V_{tn}$ can be determined by:

$$V_{tn} = V_{gn} + V_w * \cos \psi_w$$

where $V_{gn}$ is the north component of ground speed, $V_w$ is the wind speed and $\psi_w$ is the wind direction. The east component of the true airspeed $V_{te}$ can be determined by:

$$V_{te} V_{ge} V_w * \sin \psi_w$$

where $V_{ge}$ is the east component of ground speed and $V_w$ is the wind speed.

Figure 4:
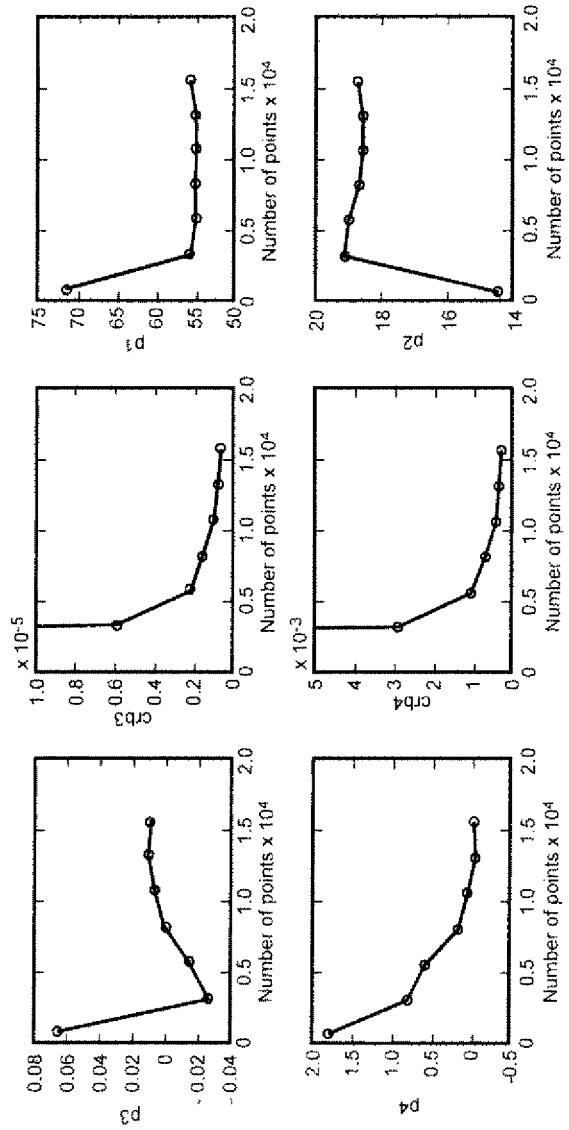
FIG. 4 illustrates the effect of sample size on identified calibration parameters.

The pressure error model can be of various forms, such as those illustrated in FIG. 4. The pressure error model:

$$\Delta p/q_c = k_1 k_2/q_{ci}$$

where $q_c$ is true impact pressure, $k_1$ and $k_2$ are model constants, and $q_{ci}$ is measured impact pressure, is representative of typical static pressure errors on aircraft. The variables $k_1$ and $k_2$ are determined as well known in the art.

Maneuver criteria for conventional in-flight calibration methods generally include requirements for steady test conditions to minimize effects such as pressure lags or flow unsteadiness. Therefore, airspeed should be quasi-steady to minimize pressure sensing lag effects. Additionally, the angle of attack effects should be considered however, these are usually minimal for typical cruise airspeeds. The minimum airspeed should be chosen to minimize angle of attack effects. Further, test conditions should be at nearly constant altitude and over a small geographic area to minimize variations in wind speed and wind direction. Lastly, vehicle maneuvering should be limited to mild turns to minimize angular rate effects on local airflow.

In-flight measurements of impact pressure are compared to actual impact pressure computed from true airspeed. The difference between the measured and actual impact pressures represents the pressure sensing error. This error is calculated for a range of airspeed. The in-flight measurements of impact pressure are based on sensing the total pressure and static pressure from pressure ports typically used in pitot tube systems. The difference between total pressure and static pressure 110 is referred to as "impact" or "differential" pressure and is a direct function of forward airspeed using isentropic flow-equations.

True airspeed is calculated by vector summing of ground speed, based on values from the GPS and the wind speed. The optimization process calculates a pressure error mathematical model 118 as a function of calibrated airspeed to minimize the pressure sensing error. The estimated wind vector (velocity and direction) is also estimated as part of the process. A statistically-based maximum likelihood method 120, referred to as output error, is used to estimate the values of the parameters describing the pressure error model 118 and the wind vector values. Flight data is acquired through digital sampling of impact pressure 102, atmospheric conditions 116 (e.g. ambient temperature) and GPS 114 ground speed. Confidence bounds for the estimated parameters are controlled via sample size.

This approach of the present invention reduces maneuver complexity and test time relative to current methods by eliminating the need for highly constrained and precise flight patterns, while providing statistical control over the calibration accuracy for the range of airspeeds tested. More specifically, this method reduces requirements for maintaining precise flight headings and airspeeds, compared to other GPS-based methods. While this method requires the test maneuvers to be flown at constant altitude due to the assumption of constant winds, the maneuvers can be flown over a more geographically constrained test area completely independent of ground-based test facilities. This method requires digital measurements and recording of the differential pressure and GPS ground speeds as inputs to the system identification algorithm, which allows more rapid assessment of the calibration accuracy over current methods. Further, while wind velocity and direction are assumed constant throughout the maneuver, this assumption is more valid for the present invention due to the method being faster and over a smaller geographical area.

In accordance with the present invention, calibration was performed for the "S-2" aircraft, comprising approximately 16000 data points over 320 seconds (@ 50 hz) predominantly at two airspeeds, 70 and 90 KCAS (Calibrated airspeed, knots). Runs were obtained for varying amounts of data, ranging from to 750 to 16000 points, to assess the effect on model parameters and confidence intervals. FIG. 4 shows the variation of model parameters p1, p2 (corresponding to pressure error model parameters, $k_1$ and $k_2$ respectively), p3 (wind direction, $\psi_w$), p4 (wind velocity, $V_w$) and the confidence intervals for p3 (crb3) and p4 (crb4). The wind velocity and direction were nearly constant with a small sample size. The variation of parameters p3 and p4, as well as the confidence intervals indicated that at least 10000 samples were needed to converge to a stable solution. For two speed conditions, this required a dwell time of approximately one to two minutes at each airspeed. This variation of parameters with sample size is due to system characteristics such as noise, turbulence, and transducer sensitivity that could change for different aircraft or atmospheric conditions. Also, depending on the overall accuracy requirements, the dwell time may be reduced. Important influences on overall accuracy are: GPS groundspeed accuracy, pressure transducer sensitivity, pressure transducer calibration, and turbulence levels.

Figure 5:
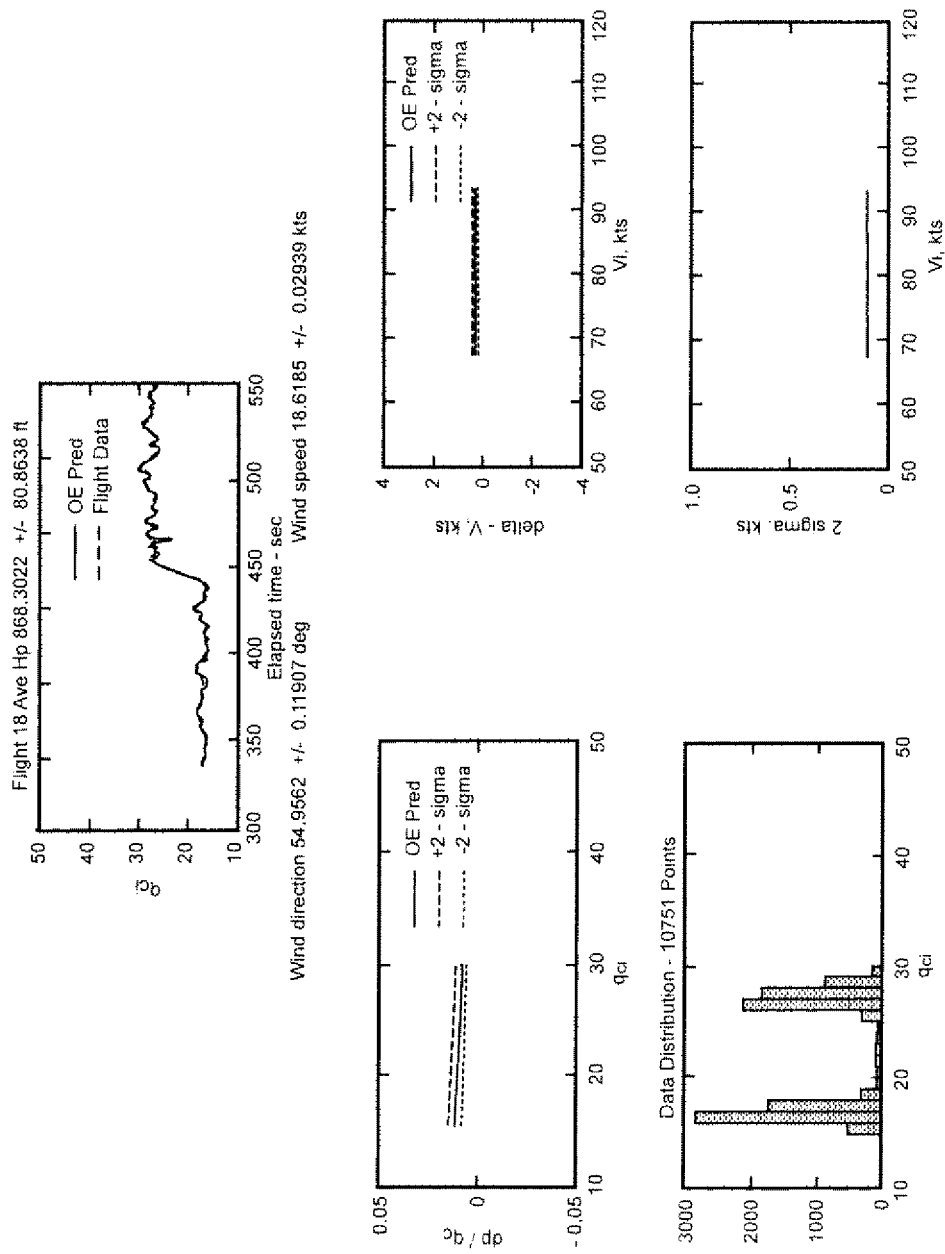
FIG. 5 illustrates calibration results for 10751 data points for a subscale test aircraft (named S-2)
Figure 6:
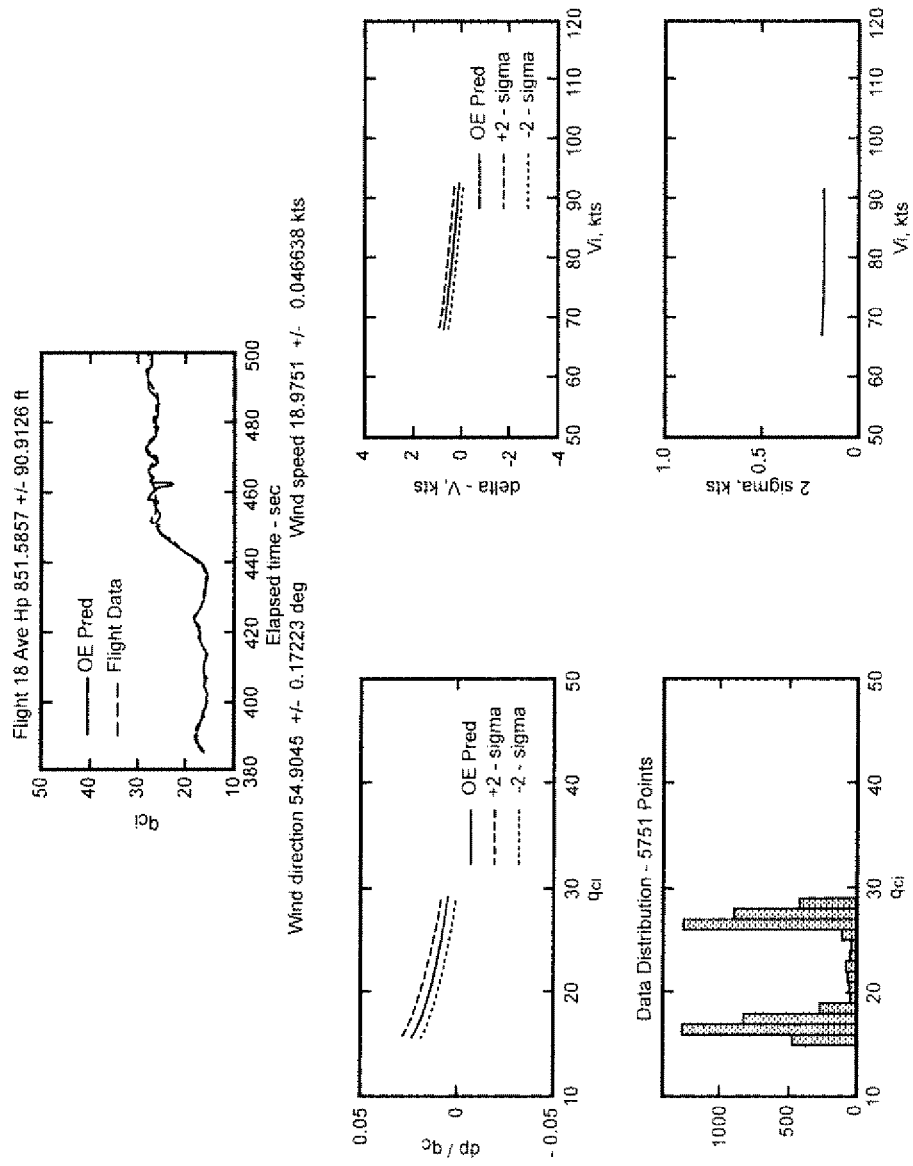
FIG. 6 illustrates calibration results for 5751 data points for the subscale test aircraft (named S-2)

Based on the results in FIG. 4, the calibration for 10751 points was derived and is shown in FIG. 5. The data distribution shows most of the points are near the minimum or maximum airspeeds. The overall airspeed error is nearly constant for all speeds at approximately 0.5 kts and the 2-σ confidence interval is less that 0.2 kts. To illustrate the influence of sample size on the results, the calibration using 5751 points is shown in FIG. 6. For this result, the pressure and airspeed error shows some variation with airspeed, however the 2-σ confidence interval is nearly the same. In both cases it may be concluded that the overall system error ranges from approximately 0.5 to 1.0 kts with small confidence boundaries. Small differences in the predicted wind speed and direction are indicated as well.

Figure 7:
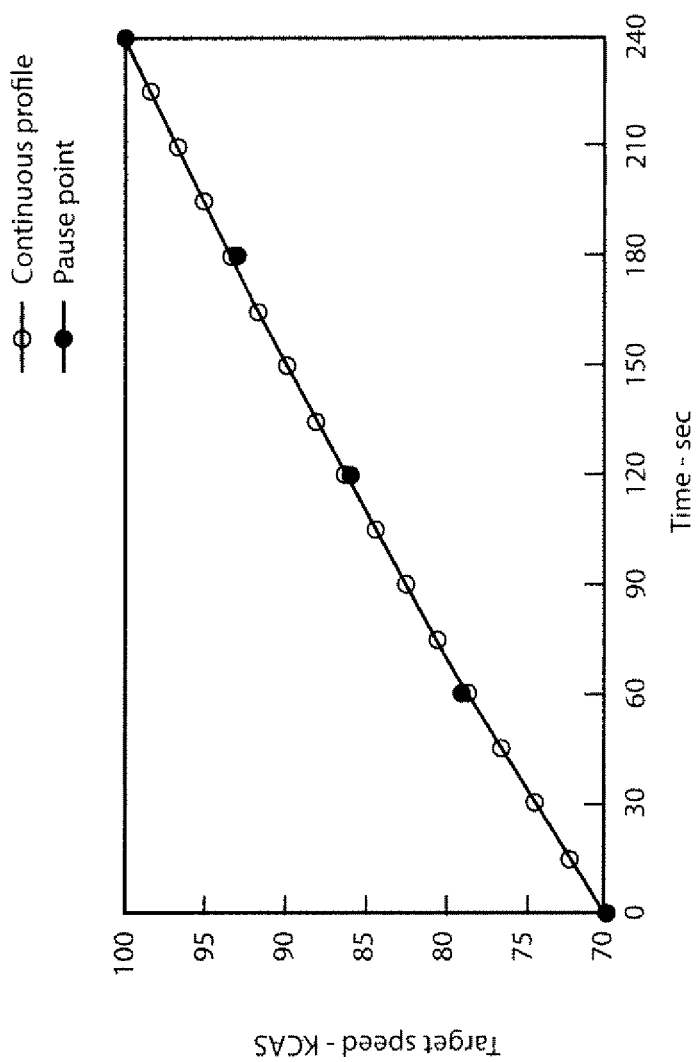
FIG. 7 illustrates airspeed profiles for a subscale test aircraft (named T-2) calibration maneuvers.

Based on the "S-2" flight test results, optimized maneuvers were designed and tested using the "T-2" aircraft. Because output error methods can be affected by data distribution, an important consideration in designing calibration maneuvers was the distribution of impact pressure measurements over the range of impact pressures tested. Therefore, two airspeed maneuver profiles were designed to minimize non-uniform data effects; 1) step and pause and 2) continuous acceleration; at airspeeds from 70 to 100 KCAS. FIG. 7 shows airspeed versus time for each profile. For the step and pause maneuver, the target airspeed is maintained for approximately 60 seconds followed by a rapid acceleration to the next airspeed. For the continuous acceleration maneuver, airspeed is slowly increased over a time period of 240 seconds. The variation of airspeed with time is non-linear in order to maintain a uniform distribution of pressure measurements.

Figure 8:
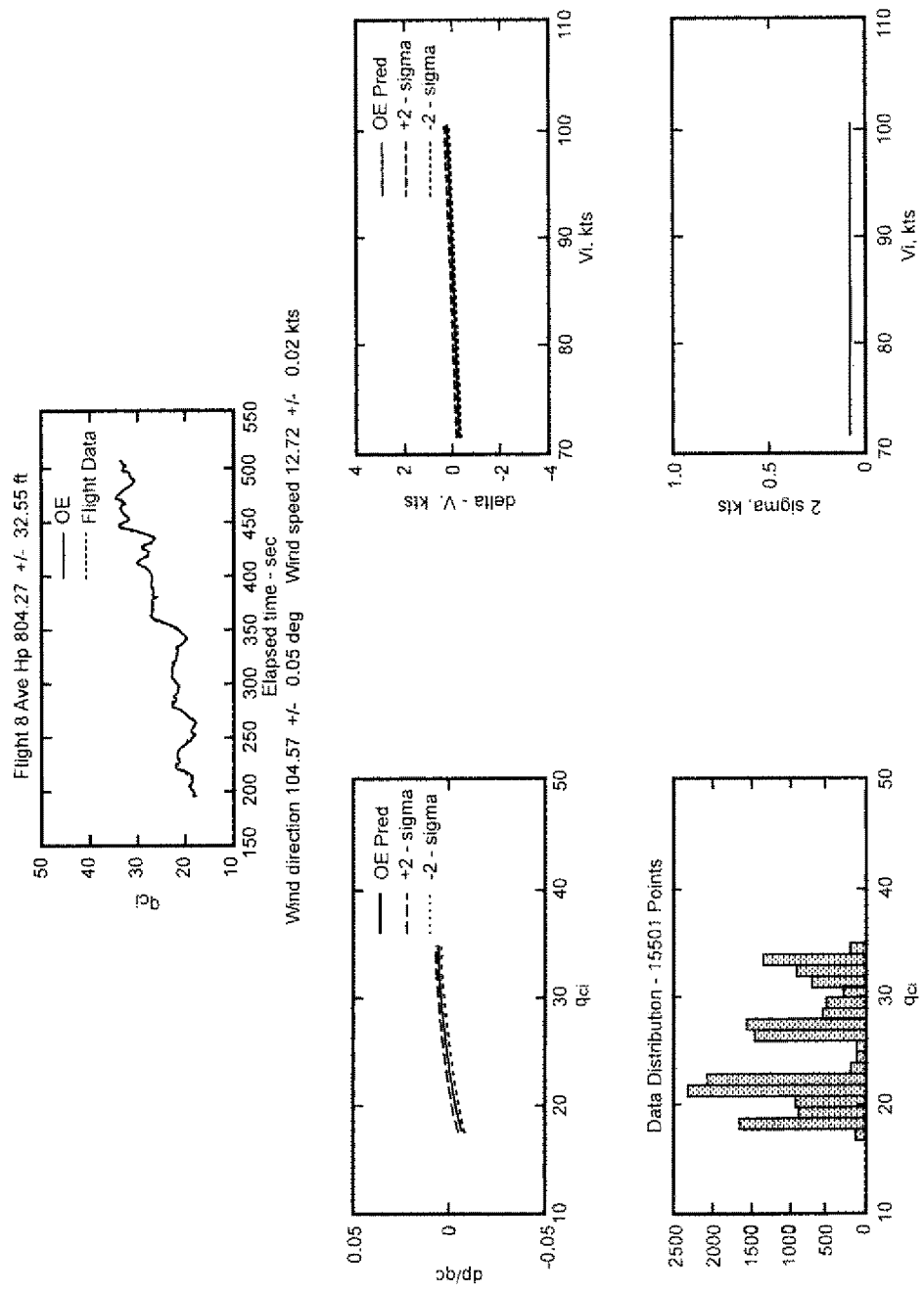
FIG. 8 illustrates calibration results for the step and pause maneuver for the subscale test aircraft (named T-2)
Figure 9:
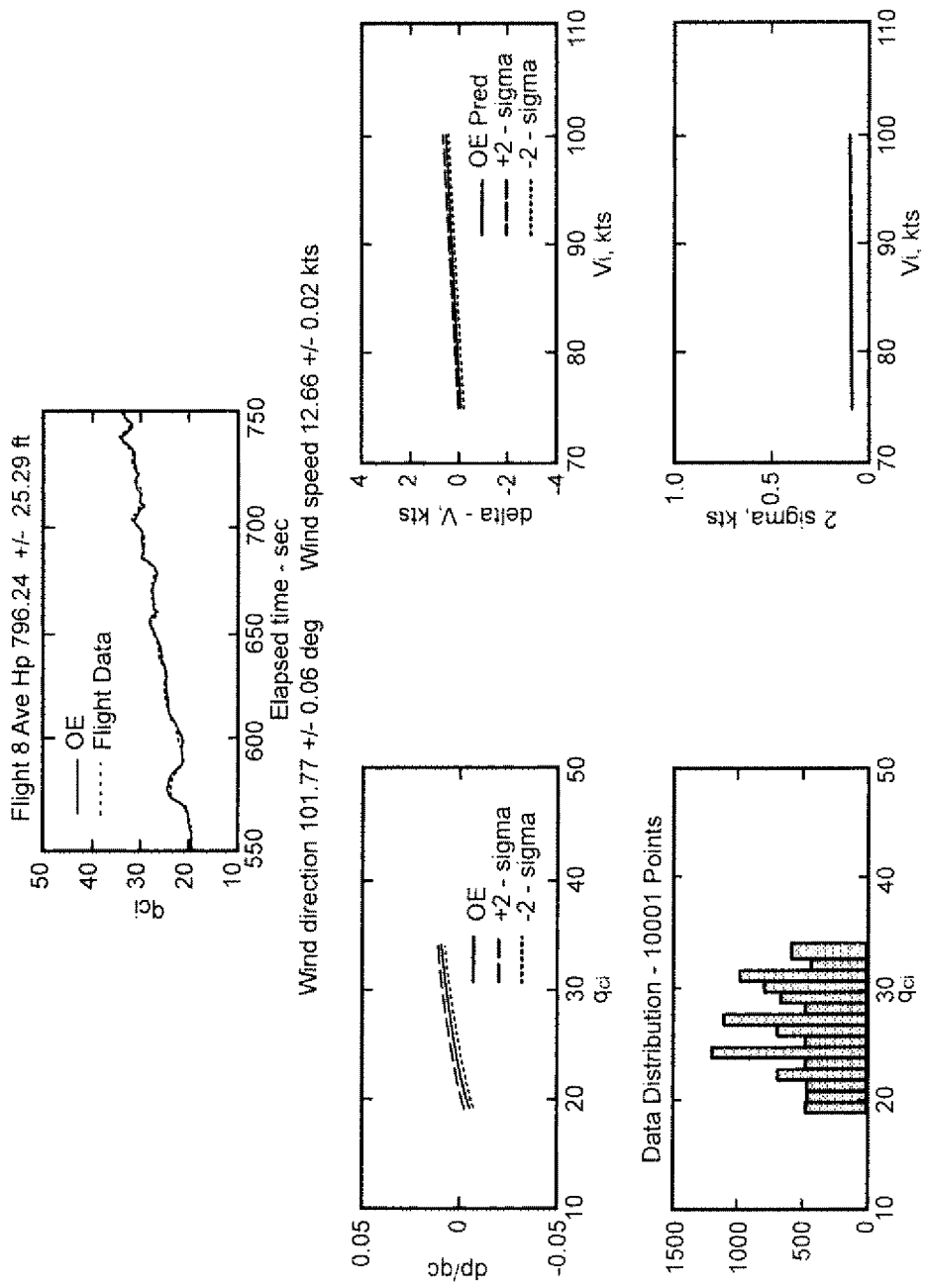
FIG. 9 illustrates calibration results for the continuous acceleration maneuver for the subscale test aircraft (named T-2).

Calibration results for the step and pause maneuver and the continuous acceleration maneuver are shown in FIGS. 8 and 9, respectively. Both maneuvers were flown sequentially on one flight to allow a comparison between the two methods with similar wind conditions. The desired maneuver criteria were to maintain altitude +/−50 ft from the target altitude (800 ft) and airspeed +/−5 KCAS from the target value. Desired performance was achieved for both maneuvers with satisfactory pilot workload. Both maneuvers yielded similar calibration results with absolute airspeed errors less than 0.5 KCAS and 2-σ confidence intervals less than 0.2 KCAS. Also, the predicted wind speed and direction were very similar for both methods. The step and pause maneuver required more time to complete due to the time required to change airspeeds.

The advantages of the present invention are numerous. The pressure error is modeled as a continuous function of airspeed rather than computed for discrete airspeeds. This allows statistical control over the estimates of pressure error and allows for a faster data acquisition approach than is possible with existing techniques. This reduces the flight test time required for the calibration, associated cost reductions, and control over the desired accuracy of airspeed calibration. Additionally, the optimal estimate of wind speed and direction is provided.

Additional discussion of the present invention is provided in Foster, John V. and Cunningham, Kevin, A GPS-Based Pitot-Static Calibration Method Using Global Output-Error Optimization, AIAA, 2010, incorporated herein by reference in its entirety.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A GPS-based computer-implemented method for determining pitot-static tube pressure sensing error of an aircraft in flight, comprising the steps:
   outfitting an aircraft with at least one pitot-static tube;
   collecting, from an aircraft's global positioning system (GPS) while the aircraft is in flight, UPS based ground speed measurements;
   collecting, from the aircraft's one or more atmospheric sensors while the aircraft is in flight, measurements of atmospheric conditions;
   collecting, from the aircraft's pitot-static tube while the aircraft is in flight, pitot-static tube total pressure and static pressure as a function of airspeed;
   determining measured impact pressure from said pitot-static tube total pressure and static pressure while the aircraft is in flight;
   inputting said ground speed measurements, said atmospheric conditions; and said measured impact pressure into a selected pressure error model that models pitot-static tube pressure sensing error as a continuous function of airspeed while the aircraft is in flight;
   adjusting automatically, with a processor, one or more pressure error model parameters of the pressure error model using an output-error optimization algorithm to produce an automatically adjusted pressure error model while the aircraft is in flight; and
   determining, with the processor, pitot-static tube pressure sensing error as a function of airspeed using said automatically adjusted pressure error model while the aircraft is in flight.

2. The method of claim 1, wherein said pressure error model is defined by the equation $\Delta p/q_c = k_1 + k_2/q_{ci}$, where $q_c$ represents impact pressure, $k_1$ and $k_2$ represent model parameters, $q_{ci}$ represents measured impact pressure, and $\Delta p$ represents pressure error $q_c - q_{ci}$.

3. The method of claim 1, wherein said atmospheric conditions are one or more conditions selected from the group consisting of temperature, static pressure and density.

4. A GPS-based system for determining pitot-static tube pressure sensing error while an aircraft is in flight, comprising:

a global positioning system (UPS) adapted to be mounted on an aircraft and configured to produce ground speed measurements while the aircraft is in flight;

one or more atmospheric sensors adapted to be mounted on the aircraft and configured to collect measurements of atmospheric conditions while the aircraft is in flight;

a differential pressure sensor adapted to be mounted on the aircraft and configured to determine measured impact pressure from total pressure and static pressure measured while the aircraft is in flight by a pitot-static tube as a function of airspeed wherein said pitot-static tube is adapted to be mounted on the aircraft; and a processor adapted to be mounted on the aircraft, said processor programmed with a pressure error model configured to accept said ground speed measurements, said measurements of atmospheric conditions, and said impact pressure to produce an estimated pressure error as a continuous function of airspeed while the aircraft is in flight; wherein one or more pressure error model parameters are automatically adjusted while the aircraft is in flight using an output-error optimization algorithm programmed in said processor to minimize the error between said measured impact pressure and an estimated impact pressure.

5. The system of claim 4, wherein said pressure error model is defined by the equation $\Delta p/q_c = k_1 + k_2/q_{ci}$, where $q_c$ represents impact pressure, $k_1$ and $k_2$ represent model parameters, $q_{ci}$ represents measured impact pressure, and $\Delta p$ represents pressure error $q_c - q_{ci}$.

6. The system of claim 4, wherein said atmospheric sensors collect one or more measurements of atmospheric conditions selected from the group consisting of temperature, static pressure and density.

7. A non-transitory computer-readable medium comprising computer executable instructions that when executed by a processor mounted on an aircraft, cause the processor to determine pitot-static tube pressure sensing error, the determination comprising at least:

receiving an aircraft's global positioning system (GPS) based ground speed measurements from a GPS system on the aircraft while the aircraft is in flight;

receiving measurements of atmospheric conditions collected from the aircraft's one or more atmospheric sensors on the aircraft while the aircraft is in flight;

collecting, from a the aircraft's pitot-static tube on the aircraft, pitot-static tube total pressure and static pressure as a function of airspeed while the aircraft is in flight;

determining measured impact pressure from said pitot-static tube total pressure and static pressure while the aircraft is in flight;

inputting said ground speed measurements, said atmospheric conditions, and said measured impact pressure into a selected pressure error model configured to model pitot-static tube pressure sensing error as a continuous function of airspeed while the aircraft is in flight;

adjusting automatically, with the processor, one or more pressure error model parameters of the pressure error model using an output-error optimization algorithm while the aircraft is in flight; and determining, with the processor, pitot-static tube pressure sensing error as a function of airspeed using said pressure error model while the aircraft is in flight.

8. The computer-readable medium of claim 7, wherein said pressure error model is defined by the equation $\Delta p/q_c = k_1 + k_2/q_{ci}$, where $q_c$ represents impact pressure, $k_1$ and $k_2$ represent model parameters, $q_{ci}$ represents measured impact pressure, and $\Delta p$ represents pressure error $q_c - q_{ci}$.

9. The computer-readable medium of claim 7, wherein said atmospheric conditions are one or more conditions selected from the group consisting of temperature, static pressure and density.

* * * * *